United States Patent
Jones et al.

(10) Patent No.: US 7,337,520 B2
(45) Date of Patent: Mar. 4, 2008

(54) METHOD FOR UTILIZING FIXTURE HAVING INTEGRATED DATUM LOCATORS

(75) Inventors: Daniel E. Jones, Hamilton, OH (US);
Jacques Juneau, Amelia, OH (US);
Vineet Vermani, Norwalk, CT (US);
Sukhminder S. Grewal, New Haven, CT (US); Kenneth E. Mascarenas, Bosque Farms, NM (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 11/272,399

(22) Filed: Nov. 10, 2005

(65) Prior Publication Data
US 2006/0059676 A1    Mar. 23, 2006

Related U.S. Application Data

(62) Division of application No. 10/456,763, filed on Jun. 6, 2003, now Pat. No. 7,080,434.

(51) Int. Cl.
*B23Q 7/00*    (2006.01)
(52) U.S. Cl. .................................................. 29/559
(58) Field of Classification Search ................ 29/559, 29/425, 421.1, 406, 281.5, 283, 281.1, 56.6, 29/56.5, 50, 888.025, 889.7, 889; 269/43
See application file for complete search history.

(56) References Cited

U.S. PATENT DOCUMENTS

| | | |
|---|---|---|
| 3,171,327 A | 3/1965 | Williamson |
| 3,243,178 A | 3/1966 | Williamson et al. |
| 4,040,557 A | 8/1977 | Heverly |
| 4,369,563 A | 1/1983 | Williamson |
| 4,829,720 A | 5/1989 | Cavalieri |
| 5,178,255 A | 1/1993 | Carlson |
| 5,226,211 A | 7/1993 | Jones |
| 5,347,471 A | 9/1994 | Simon et al. |
| 5,362,036 A | 11/1994 | Whiteman |
| 5,492,581 A | 2/1996 | Searle |
| 5,751,011 A | 5/1998 | McLaughlin et al. |
| 5,910,894 A | 6/1999 | Pryor |
| 5,917,726 A | 6/1999 | Pryor |
| 6,007,628 A | 12/1999 | Ittleson et al. |
| 6,082,291 A | 7/2000 | Ittleson et al. |
| 6,094,793 A | 8/2000 | Szuba |
| 6,139,412 A | 10/2000 | Dwyer |
| 6,233,822 B1 | 5/2001 | Grossklaus, Jr. et al. |
| 6,459,473 B1 | 10/2002 | Chang et al. |

*Primary Examiner*—John C. Hong
(74) *Attorney, Agent, or Firm*—McNees Wallace & Nurick LLC

(57) ABSTRACT

A fixture adapted to precisely position two components to permit multiple machining operations of the components at a single work station. The fixture includes a backbone having a first portion for securing the first component and a second portion for securing the second component. First and second portions each further include an integral lobe and a finger which extend outwardly from the backbone, each terminating in a datum surface, as well as an additional datum surface which collectively form a set of datum locators along both the first and second portions. Each set of datum locators precisely positions the two components at a predetermined distance and orientation from each other.

19 Claims, 7 Drawing Sheets

METHOD FOR UTILIZING FIXTURE HAVING INTEGRATED DATUM LOCATORS

BACKGROUND OF THE INVENTION

The present invention relates generally to fixtures having close tolerance datum locators, and more particularly to fixtures having integrated close tolerance datum locators used for providing multiple manufacturing operations on multiple parts at a single manufacturing station.

In the manufacture of components, especially those machined to close tolerances further having intricate and complex shapes, such as gas turbine engine blades and vanes, tooling fixtures adapted to secure the components are required. Such fixtures, which represent a manufacturing station, typically contain three reference contact surfaces machined to even closer tolerance, referred to as datums, to precisely position and secure the component for the manufacturing step that is performed at the manufacturing station. Multiple stations are usually required to manufacture the component, typically one station is required for each manufacturing step. Although closer datum tolerances may be maintained in the fixtures, additive tolerance build-up is almost invariably introduced at each of the manufacturing stations resulting in components having increased dimensional deviation from that desired. Minimizing the number of fixtures required to manufacture the component is desirable due to component tolerance build-up and the high cost associated with fixture fabrication.

What is desired is an integral fixture at a single manufacturing station having at least two sets of close tolerance datum surfaces that can secure at least two parts for simultaneous multiple machining operations.

SUMMARY OF THE INVENTION

This invention pertains to a fixture adapted to precisely position at least two components at a predetermined distance and orientation therebetween for permitting a machining means directed along the fixture to simultaneously perform at least one machining operation to the at least two components. The fixture incorporates a backbone having a first portion for securing a first component and a second portion for securing a second component. The first and second portions each further including an integral set of three precisely positioned datum surfaces formed therein for precisely positioning the first and second components.

An advantage of the present invention is that it provides a fixture that reduces component tolerance build-up introduced during the manufacture of components due to reduction of the number of fixtures required.

A further advantage of the present invention is that it provides a fixture that reduces the number of manufacturing stations required to manufacture a component.

Still another advantage of the present invention is that it provides a fixture that reduces the number of machining tools required to manufacture a component.

Yet another advantage of the present invention is that rework of out-of-tolerance articles is reduced.

Other features and advantages of the present invention will be apparent from the following more detailed description of the preferred embodiment, taken in conjunction with the accompanying drawings which illustrate, by way of example, the principles of the invention. Among the advantages and objects of the present invention is to provide a fixture adaptable for multiple components to reduce the number of fixtures required for manufacture of components.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
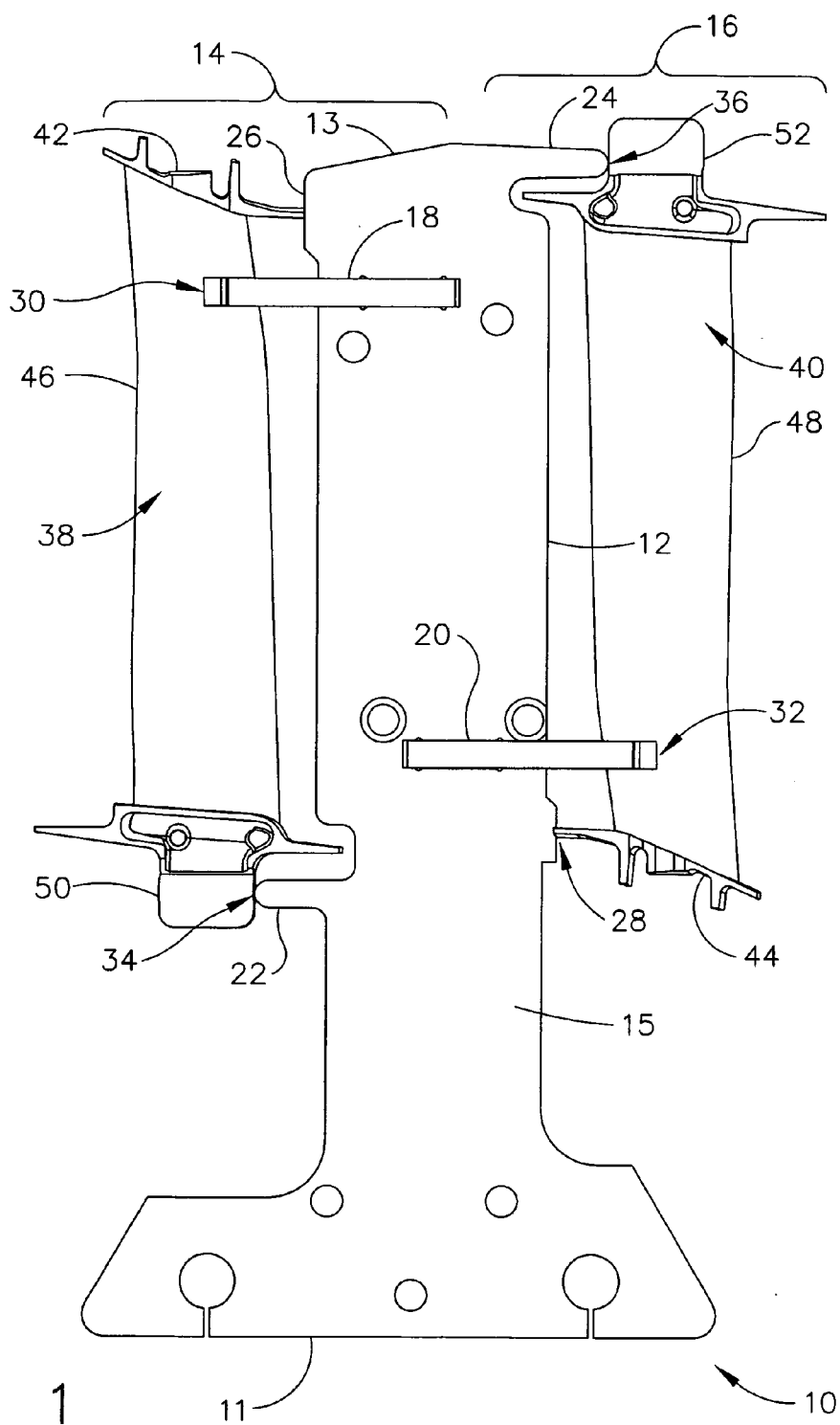
FIG. 1 is a front view of a fixture of the present invention securing two components for manufacture.

Referring to the drawings, FIG. 1 illustrates a front view of the preferred form of the invention, wherein 10 generally designates a fixture constructed in accordance with and embodying the present invention. Fixture 10 represents a single manufacturing station and includes a backbone 12 having a first portion 14 and a second portion 16 for positioning a first blade 38 and a second blade 40, respectively, therein. First portion 14 includes datum surfaces 26, 30 and 34 to precisely position first blade 38, and second portion 16 includes datum surfaces 28, 32 and 36 to precisely position second blade 40 in preparation of multiple machining operations at a single manufacturing station as will be discussed in more detail below.

Figure 2:
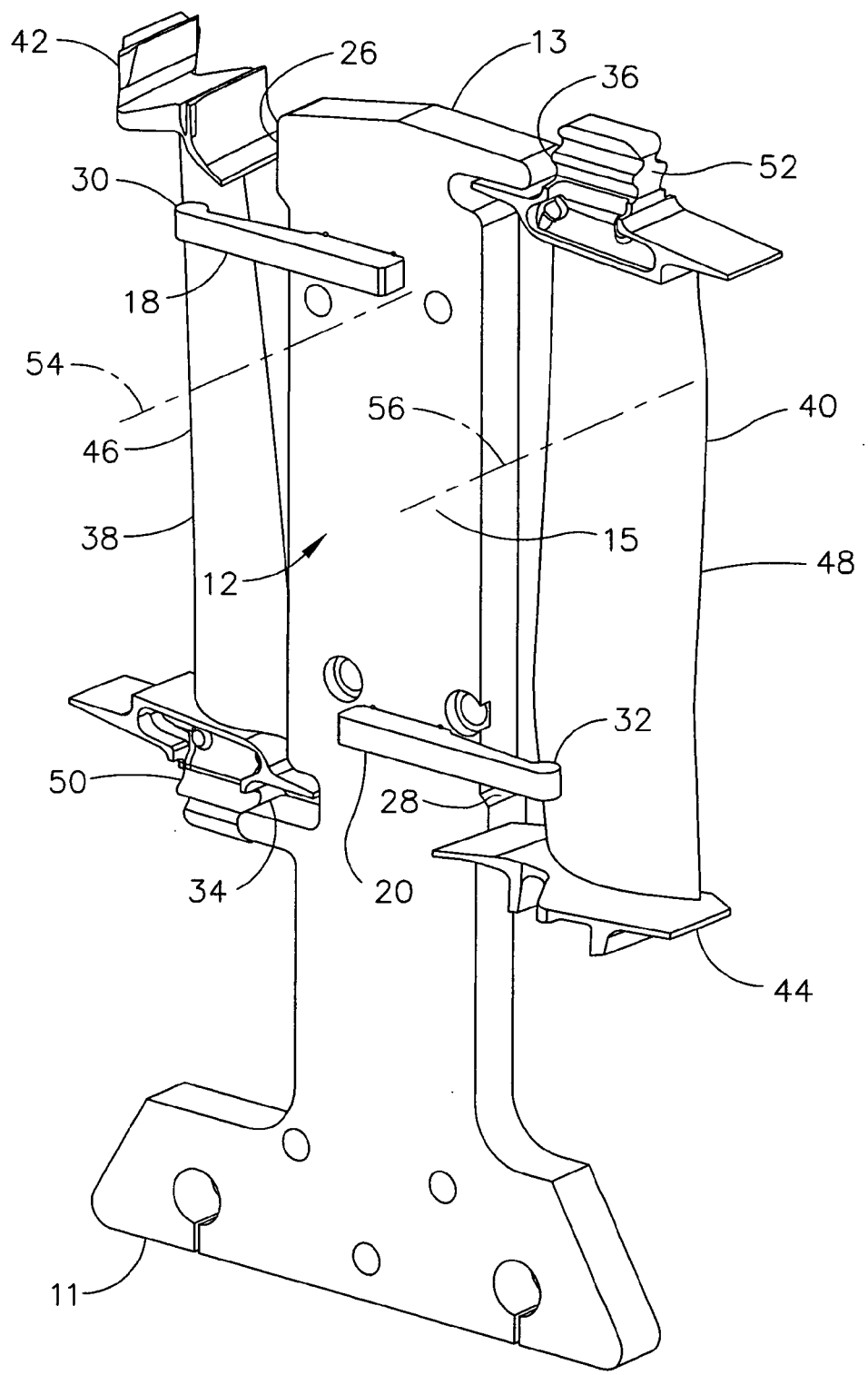
FIG. 2 is a perspective view of the fixture in FIG. 1.

Referring to FIGS. 1 and 2, fixture 10 includes a proximal end 11 for securing fixture 10 at its respective manufacturing station while blades 38, 40 are being machined. Adjacent proximal end 11 along first portion 14 a lobe 22 extends outwardly from backbone 12. Lobe 22 terminates at datum surface 34 which contacts and precisely positions a base 50, also referred as dovetail, of first blade 38. Further proceeding along backbone 12 in a direction toward its distal end 13, a finger 18 extends outwardly from a front face 15 that is opposite that of back face 17 of backbone 12 and further extends outwardly from backbone 12 along first portion 14, terminating at datum surface 30, which contacts and precisely positions a vent portion 46 of first blade 38. Further proceeding along backbone 12 in a direction toward distal end 13, datum surface 26 which is located adjacent distal end 13 along first portion 14 contacts and precisely positions a shroud 42 of first blade 38. Once first blade 38 is collectively positioned against datum surfaces 26, 30 and 34, a clamping means (not shown) secures first blade 38 in this position during manufacturing operations at this station.

Second portion 16 of backbone 12 shall now be discussed. Adjacent proximal end 11 along second portion 16 of backbone 12 is located datum surface 28 which contacts and precisely positions a shroud 44 of second blade 40. Further proceeding along backbone 12 in a direction toward distal end 13, a finger 20 extends outwardly from front face 15 of backbone 12 and further extends outwardly from backbone 12 along second portion 16, terminating at datum surface 32, which contacts and precisely positions a vent portion 48 of second blade 40. Further proceeding along backbone 12 in a direction toward distal end 13, adjacent distal end 13 along second portion 16 is located a lobe 24 that extends outwardly from backbone 12. Lobe 24 terminates at datum surface 36 which contacts and precisely positions a base 52 of second blade 40. Once second blade 40 is collectively positioned against datum surfaces 28, 32 and 36, a clamping means (not shown) secures second blade 40 in this position during manufacturing operations at this station.

Figure 3:
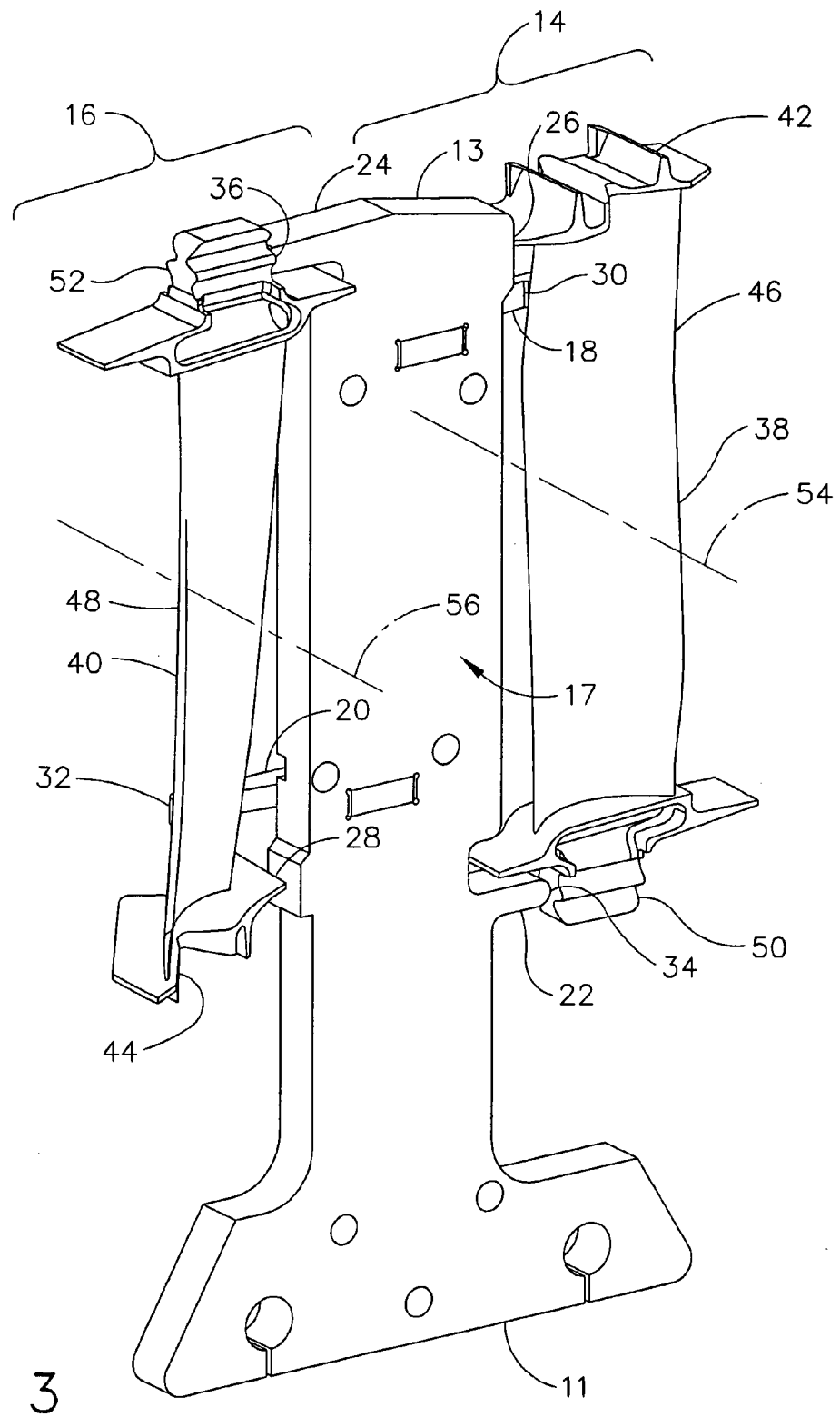
FIG. 3 is a back view of the fixture in FIG. 1.

In the preferred embodiment, first and second blades 38, 40 are identical parts. Similarly, datum surfaces 26, 30 and 34 each correspond to datum surfaces 28, 32 and 36. That is to say, collectively, each of these sets of datum surfaces contacts and precisely positions the identical portions of first and second blades 38, 40 at a predetermined spacing and orientation from each other. Each blade 38, 40 includes an axis 54, 56 which spans the center of the blade from dovetail 50 to shroud 42. The difference in orientation between first blade 38 and second blade 40 is that second blade 40 is rotated 180 degrees about its axis 56 with respect to first blade 38 that passes through the middle of second blade 40. This orientation is apparent by inspection of the orientations of first blade 38 and second blade 40 in FIGS. 1-3. Similarly, by rotating first blade 38 180 degrees about a first axis 54 that passes through the middle of first blade 38, first blade 38 matches the orientation of second blade 40.

Utilizing advances in tool forming methods, such as wire electro discharge machining ("EDM") which uses a spool of wire, typically brass, fixture 10 is shaped by vaporizing a desired path along the profile of fixture 10 to form integral datum surfaces 26, 28, 30, 32, 34 and 36, each datum surface having tolerances of +/−0.0001 of an inch from the nominal position. This high degree of precision permits multiple sets of datum surfaces to be integrated onto a single fixture without introducing tolerance build-up and further provides substantial cost savings, both as previously discussed.

A method permitting multiple machining operations to be performed at a single manufacturing station shall now be discussed. For purposes of FIGS. 4-6, designations A, B and C represent three identical blades introduced sequentially into fixture 10 at different times during the manufacturing process. Designations A' and B' represent blades A and B, respectively, rotated 180 degrees from the orientation as initially installed in first portion 14 of fixture 10, as previously discussed.

Figure 4:
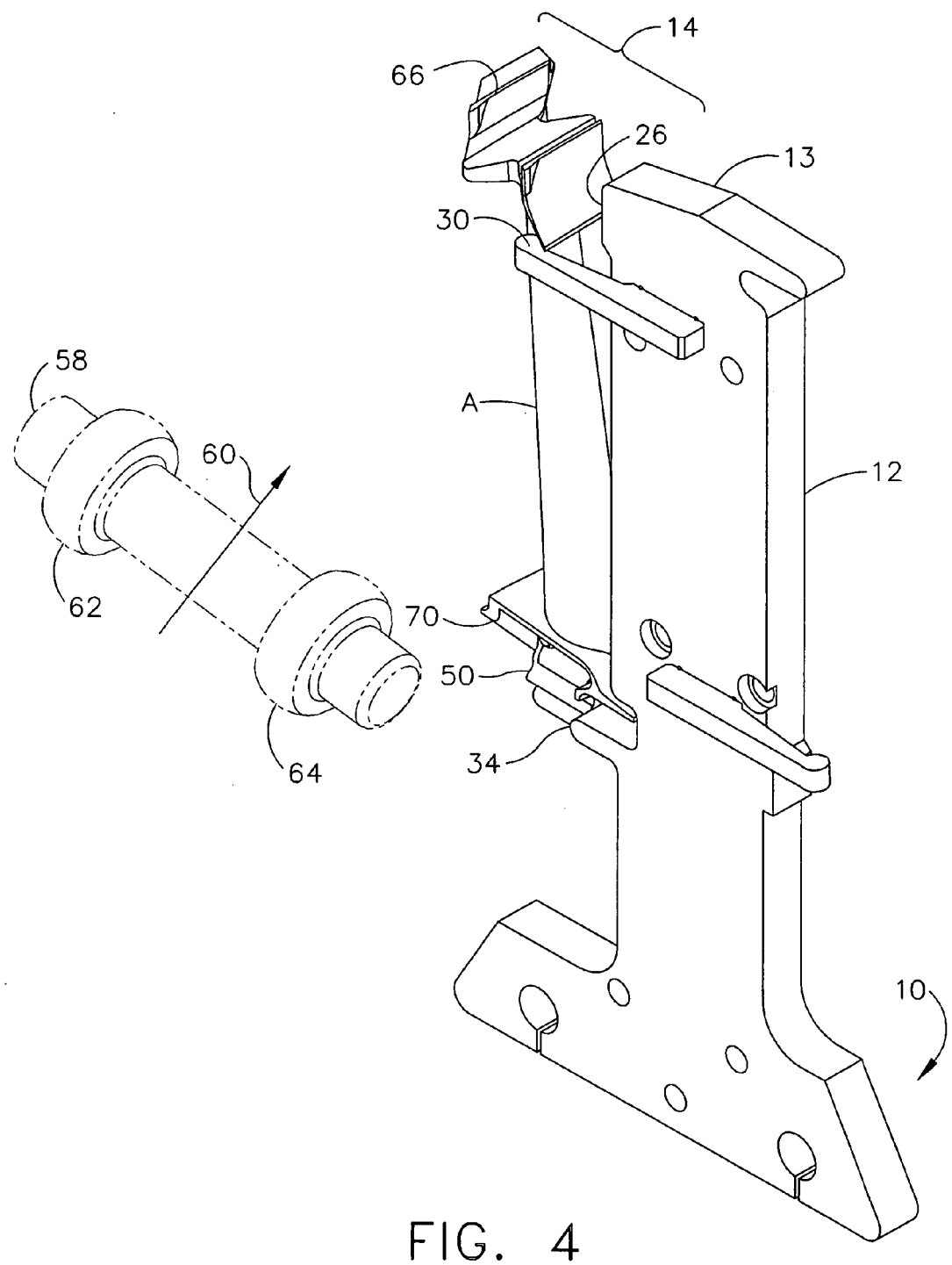
FIG. 4 is a perspective view of a first manufacturing sequence wherein the fixture is securing one component.

Referring now to FIG. 4, an operator (not shown) installs blade A, which includes positioning and securing blade A along first portion 14 of fixture 10 against datum surfaces 26, 30 and 34 with at least one clamping means (not shown). Typically, clamping means include at least one set of arms controllably actuated by hydraulic, pneumatic, spring retention or any number of other mechanical arrangement providing a controllable compressive force to opposed sides of blade A and backbone 12 fixture 10 so that blade A and fixture 10 are directed toward one another to ensure that blade A is located against the respective datum surfaces 26, 30 and 34 of the first portion 14 of the fixture 10. Two sets of clamping means are typically employed to locate and secure blade A in position against datum surfaces 26, 30 and 34. A hydraulically-powered clamping means actuated by the use of high pressure hydraulic fluid is preferably employed to locate and secure the portion of blade A adjacent shroud 42 against datum surfaces 26 and 30 due to the ability of the clamping means to apply elevated levels of compressive forces. Such elevated compressive forces are required to immobilize this portion of blade A with respect to datum surfaces 26 and 30, since these datum surfaces are adjacent shroud 42 which is machined as discussed below.

In other words, the clamping means must exert sufficient compressive forces between datum surfaces 26 and 30 and blade 38 to withstand the reactive forces created by the machining of shroud 42. Similarly, a second clamping means is preferably employed to likewise locate and secure base 50 against datum 34. However, since a decreased level of compressive forces are required to immobilize base 50 against datum 34, as compared to clamping means actuated by pneumatics, providing a lower range of compressive forces than hydraulically operated clamping means, or a spring retention clamping means, which typically provides a range of compressive forces less than pneumatically operated clamping means, may alternately be used.

Figure 5:
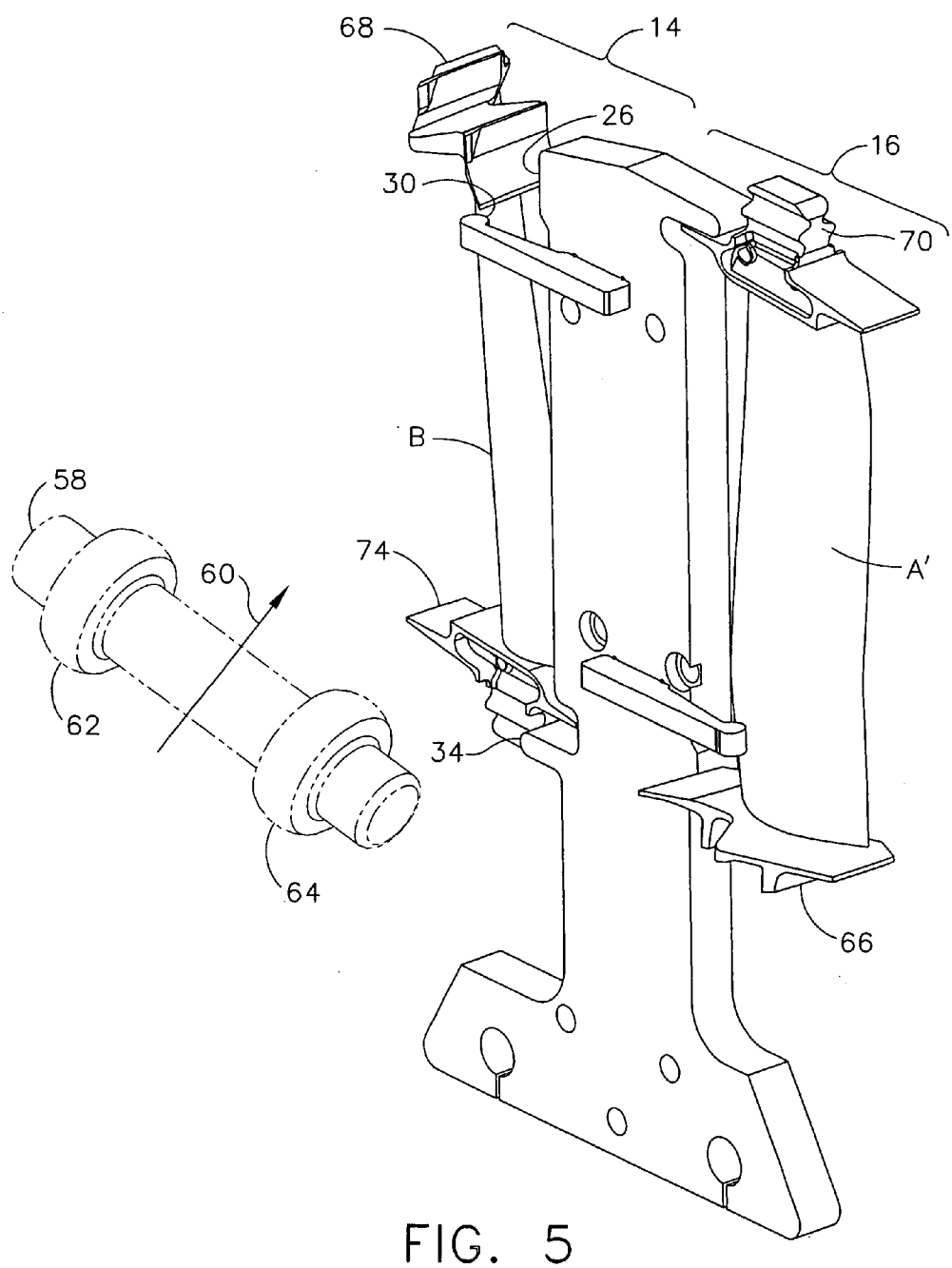
FIG. 5 is a perspective view of a subsequent manufacturing sequence wherein the fixture is securing two components.

Once blade A is secured, machining means 58, such as a grinding wheel, is directed toward fixture 10 along a travel direction 60 so that a machining portion 62 formed in machining means 58 performs a machining operation on a base 66 of blade A. Upon completion of the machining operation to base 66, the operator opens clamping means securing blade A and removes blade A from first portion 14. The operator then rotates blade A 180 degrees as previously discussed so that blade A now becomes blade A' and installs blade A' as shown in FIG. 5, which includes positioning and securing blade A' along second portion 16 of fixture 10 against datum surfaces 28, 32 and 36 with clamping means as previously discussed. In addition, operator installs blade B along first portion 14 of fixture 10 in a similar manner to installing blade A along first portion 14 of fixture 10.

Referring again to FIG. 5, once blades A' and B have been installed in fixture 10, machining means 58 is again directed toward fixture 10 along travel direction 60 so that simultaneous machining operations are performed to both blades A' and B. Machining portion 62 performs a machining operation on a shroud 68 of blade B, and a machining portion 64 formed in machining means 58 performs a machining operation on a base 70 of blade A'.

Figure 6:
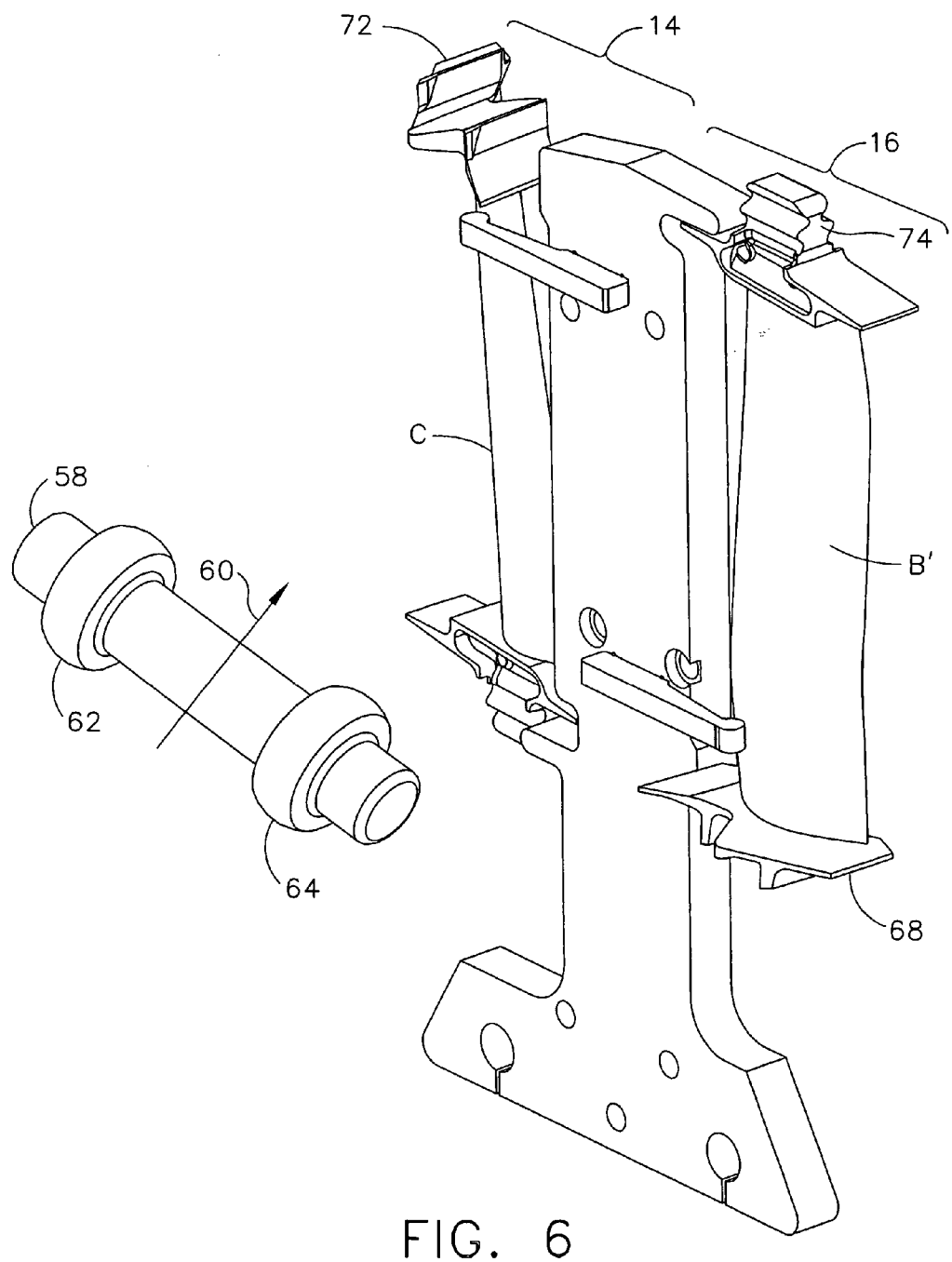
FIG. 6 is a perspective view of a still subsequent manufacturing sequence wherein the fixture is securing two components.

Referring to FIGS. 5 and 6, once the machining operation to shroud 70 of blade A' and base 68 of blade B has been completed, operator opens clamping means securing blade A', removes blade A' from second portion 16, and sets blade A' aside for subsequent manufacturing operations at a different manufacturing station, if required. Operator then opens clamping means securing blade B along first portion 14, removes blade B from first portion 14, rotates blade B 180 degrees as previously discussed, wherein blade B now becomes blade B', and installs blade B' along second portion 16 of fixture 10. Finally, operator installs blade C along second portion 14 of fixture 10.

Once blades B' and C have been installed in fixture 10, machining means 58 is again directed toward fixture 10 along travel direction 60 so that simultaneous machining operations are performed to both blades B' and C. That is, machining portion 62 performs a machining operation on a shroud 72 of blade C, and machining portion 64 performs a machining operation on a base 74 of blade B'. Additional blades can be machined utilizing this method.

Figure 7:
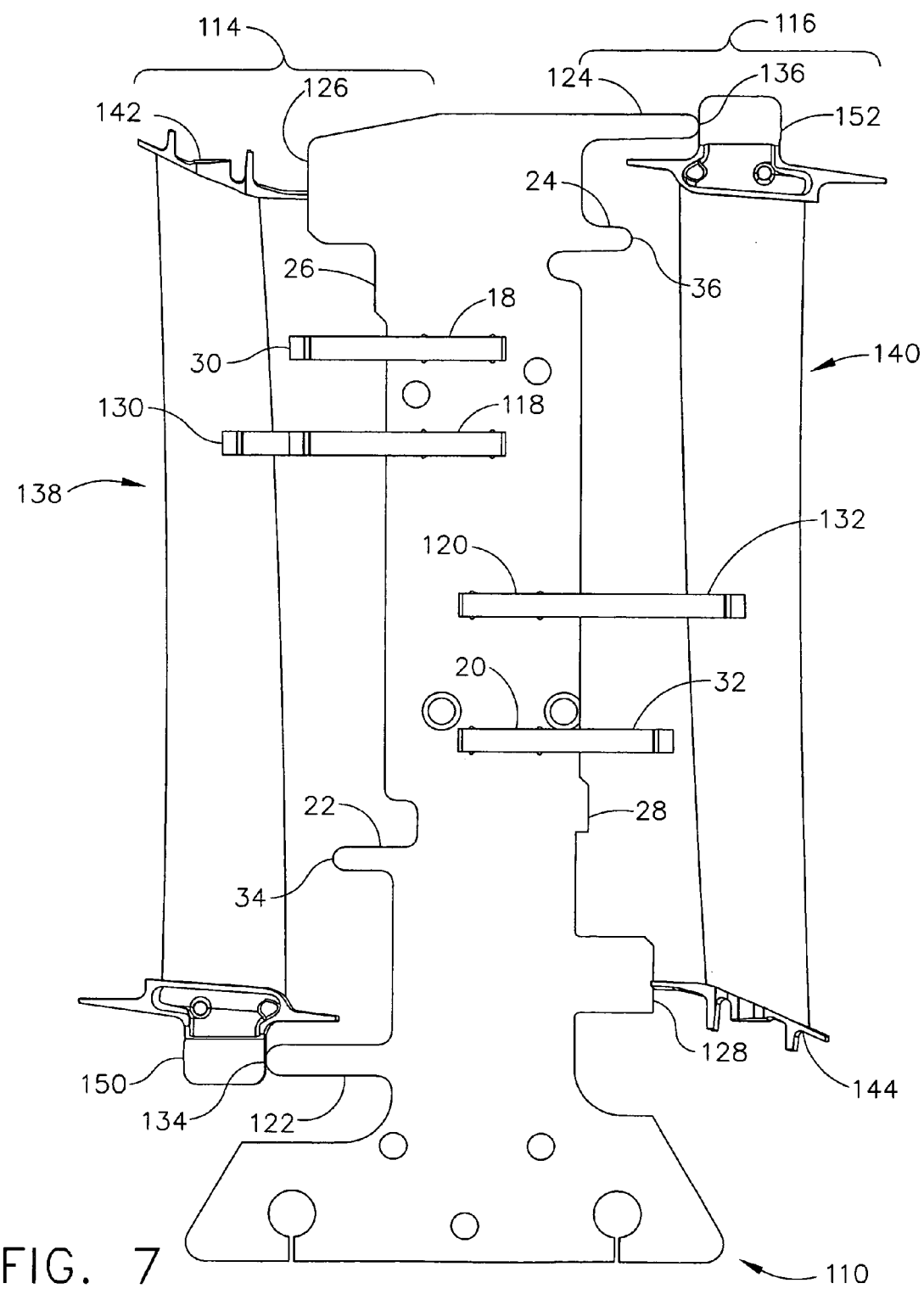
FIG. 7 is a front view of an alternate embodiment of a fixture of the present invention securing components for manufacture.

Although first and second blades 38, 40 are the same part in the preferred embodiment, it is apparent to one skilled in the art that these components need not be identical. That is to say, it may be possible to further add datum surfaces along first and second portions 14, 16 of backbone 12 to additionally accommodate blades of different lengths, preferably configured for machining operations utilizing the same machining means 58. For example, referring to FIG. 7, an alternate embodiment of fixture 110 has all the features of fixture 10, but has an additional set of datum surfaces for first portion 114 and second portion 116. The additional sets of datum surfaces and associated features are differentiated from the surfaces and features of fixture 10 by the addition of a "1" digit to the left of the originally identified features for fixture 10. In other words, datum surfaces 126, 130 and 134 of a first portion 114 accommodate a first blade 138 which is longer than blade 38, and similarly, data surfaces 128, 132 and 136 of a second portion 116 accommodate a second blade 140, which is identical to blade 138. Similarly, although the present invention is directed to fixtures for securing turbine rotor blades, it is apparent that any number of components capable of being located by datum surfaces may be employed. Additionally, while the present invention is directed to a machining means such as a grinding wheel, any cutting blades, abrasives, high pressure fluid cutting streams, high temperature or high energy cutting beams or any other manufacturing methods that can be utilized to effect shaping of a component is contemplated. Further, although the preferred embodiment secures first and second blades at a predetermined spacing and orientation 180 degrees with respect to each other, there may be component geometries that may utilize a different orientation. Moreover, although the preferred embodiment is directed to a fixture securing two components, it is apparent that the fixture could be configured to accommodate more than two components by either widening the fixture to additionally include, for example, third and fourth portions to secure third and fourth components, respectively, or to "piggy back" a second fixture substantially identical to the first fixture (the fixture of the present invention) wherein the first and second fixtures are integral with respect to each other and aligned to receive machining means 58. Finally, it is apparent that regarding the method for employing the present invention, the order of installation and/or removal of the components from the fixture by the operator, or by an automated system is not critical and may be performed in any order so long as the components are secured prior to the machining process.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for simultaneously performing at least one manufacturing operation to each of at least two components utilizing a single fixture, the method comprising the steps of:

providing a fixture having a backbone further having a first portion for securing a first component thereto and a second portion for securing a second component thereto; at least three immobile precisely positioned datum surfaces formed on each of the first portion and the second portion; the datum surfaces of the first and the second portions corresponding to each other and to datum surfaces of the first and second components;

securing datum surfaces of the first component to the at least three precisely positioned datum surfaces on the first portion;

securing datum surfaces of the second component to the at least three precisely positioned datum surfaces on the second portion; and directing a manufacturing means along the fixture to simultaneously perform at least one manufacturing operation to each of the first and second components of the at least two components along the fixture.

2. The method of claim 1 wherein the manufacturing means is at least one cutting blade.

3. The method of claim 1 wherein the manufacturing means is a high pressure fluid cutting stream.

4. The method of claim 1 wherein the manufacturing means is a high energy cutting beam.

5. The method of claim 1 wherein the components are identical.

6. The method of claim 1 wherein the components are gas turbine engine blades.

7. The method of claim 1 wherein the components are gas turbine engine vanes.

8. The method of claim 1 wherein the manufacturing means is a grinding wheel.

9. The method of claim 1 wherein the providing, securing and directing steps including the steps of:

providing a fixture having a backbone further having a third portion through a corresponding portion for each securing a corresponding third component through a corresponding component thereto; at least three precisely positioned datum surfaces formed on each of the third portion through the corresponding portion; the datum surfaces of the third portion through the corresponding portion corresponding to each other and to datum surfaces of the corresponding third component through corresponding component;

securing each of the third component through corresponding component to the at least three precisely positioned datum surfaces on the corresponding third portion through corresponding portion; and directing a manufacturing means along the fixture to simultaneously perform at least one manufacturing operation to each of the third through corresponding components of the at least two components along the fixture.

10. A method for performing at least two manufacturing operations to at least two substantially identical components utilizing a single fixture, the method comprising the steps of:

providing a fixture having a backbone further having a first portion for securing a component in a first position thereto and a second portion for securing the component previously secured to the first portion, the second portion for securing the component in a second position thereto; at least three immobile precisely positioned datum surfaces formed on each of the first portion and the second portion; the datum surfaces of the first and the second portions corresponding to each other and to datum surfaces of the components;

securing datum surfaces of a first component in the first position to the at least three precisely positioned datum surfaces on the first portion;

directing a manufacturing means along the fixture to perform at least one manufacturing operation to the first component along the fixture;

removing the first component from the first portion;

securing datum surfaces of the first component in the second position to the at least three precisely positioned datum surfaces on the second portion;

securing datum surfaces of a second component in the first position to the at least three precisely positioned datum surfaces on the first portion;

directing the manufacturing means along the fixture to simultaneously perform at least one manufacturing operation to each of the two components of the at least two components along the fixture.

11. The method of claim 10 wherein the first position of the first and second components is oriented substantially 180 degrees with respect to the second position.

12. The method of claim 10 wherein the manufacturing means is at least one cutting blade.

13. The method of claim 10 wherein the manufacturing means is a high pressure fluid cutting stream.

14. The method of claim 10 wherein the manufacturing means is a high energy cutting beam.

15. The method of claim 10 wherein the components are gas turbine engine blades.

16. The method of claim 10 wherein the components are gas turbine engine vanes.

17. The method of claim 10 wherein the manufacturing means is a grinding wheel.

18. The method of claim 10 wherein the providing, securing and directing steps including the steps of:

providing a fixture having a backbone farther having a third portion through a corresponding portion for each securing a corresponding third component through a corresponding component thereto; at least three precisely positioned datum surfaces formed on each of the third portion through the corresponding portion; the datum surfaces of the third portion through the corresponding portion corresponding to each other and to datum surfaces of the corresponding third component through corresponding component;

securing each of the third component through corresponding component to the at least three precisely positioned datum surfaces on the corresponding third portion through corresponding portion; and directing a manufacturing means along the fixture to simultaneously perform at least one manufacturing operation to each of the third through corresponding components of the at least two components along the fixture.

19. A method for simultaneously performing at least one manufacturing operation to each of at least two components utilizing a single fixture, the method comprising the steps of:

providing a fixture having a backbone further having a first portion through a corresponding portion for each securing a corresponding first component through a corresponding component thereto; at least three precisely positioned datum surfaces formed on each of the first portion through the corresponding portion; the datum surfaces of the first portion through the corresponding portion corresponding to each other and to datum surfaces of the corresponding first component through corresponding component;

securing each of the first component through corresponding component to the at least three precisely positioned datum surfaces on the corresponding first through corresponding portion; and directing a manufacturing means along the fixture to simultaneously perform at least one manufacturing operation to each of the first through corresponding components of the at least two components along the fixture.

* * * * *